Feb. 21, 1967     T. R. ARDEN     3,304,663
SHARPENING HEAD
Filed Jan. 31, 1964     2 Sheets-Sheet 1
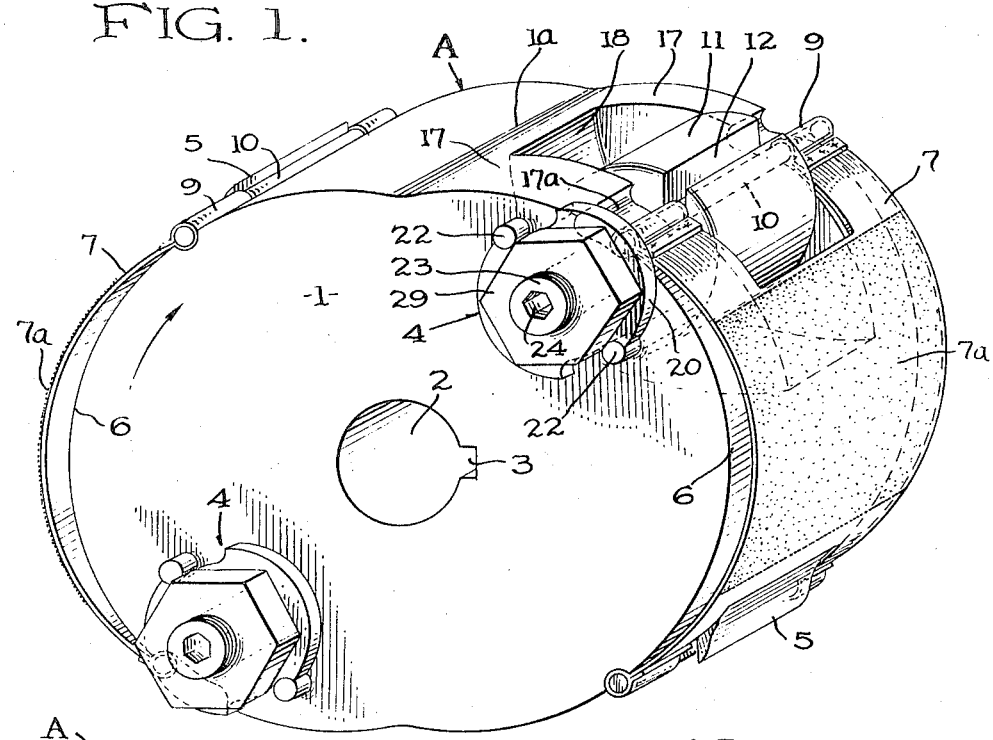
FIG. 1.
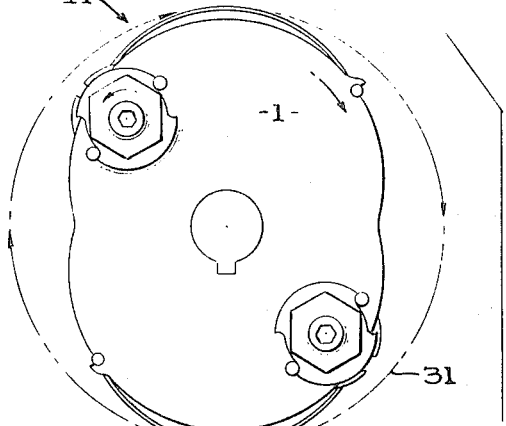
FIG. 2.
FIG. 3.
FIG. 4.
FIG. 5.
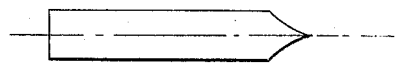
INVENTOR
THOMAS R. ARDEN
BY *Emery L. Groff Jr.*
ATTORNEY Feb. 21, 1967  T. R. ARDEN  3,304,663
SHARPENING HEAD
Filed Jan. 31, 1964  2 Sheets-Sheet 2
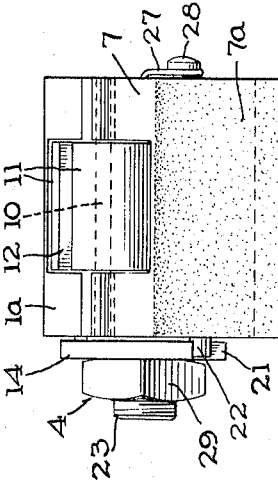
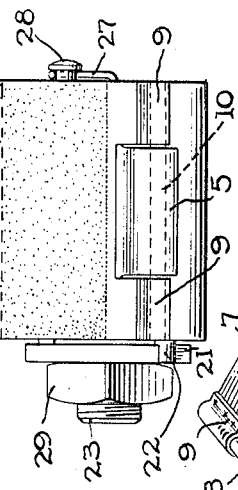
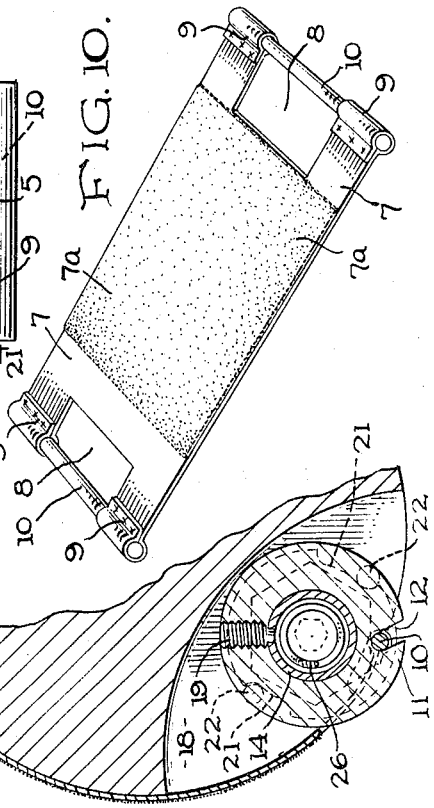
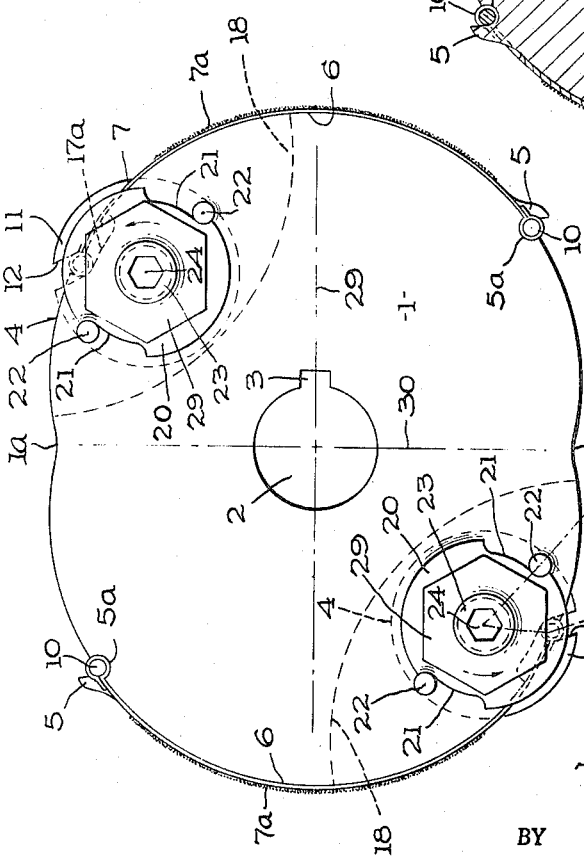
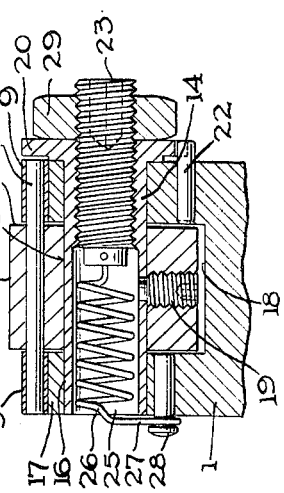
INVENTOR
THOMAS R. ARDEN
BY
ATTORNEY United States Patent Office 3,304,663
Patented Feb. 21, 1967

3,304,663
SHARPENING HEAD
Thomas R. Arden, 3 Deer Hill Drive, Danbury, Conn.;
Ruth B. Arden, executrix of said Thomas R. Arden, deceased
Filed Jan. 31, 1964, Ser. No. 341,563
10 Claims. (Cl. 51—384)

This invention relates generally to sharpening devices, and more particularly, to a rotating sharpening head adapted primarily for producing the finished cutting edge on a fine-edged cutting instrument, for example, a razor blade or surgical scalpel.

The present practice for producing the final cutting edge on a fine-edged blade comprises buffing the previously ground edge with a rotating cloth buff wheel. However, there has always been a major drawback to this method in that the fine feather which is produced on the edge during the grinding stage, although it is removed during the buffing operation, nevertheless, leaves a cutting edge which is disposed at an angle substantially divergent from the center axis of the cutting blade. Such defective cutting edges as produced by the prior known apparatus are readily apparent when in the hands of a highly skilled skilled technician, for example, a surgeon or pathologist. Examination of many blades finish sharpened by means of a rotating buff has revealed cutting edges having center axes which are as much as 75° divergent from the center lognitudinal axes of the blade. One may readily appreciate the predicament of a surgeon attempting to perform a biopsy, for example, while using a blade whose cutting edge is so off-center as to affect the successful performance of this delicate maneuver.

The present invention overcomes the previous objections by substituting for the final buffing stage, an ultra-fine grinding operation by a novel apparatus intended to produce a near-perfect cutting edge. This grinding operation is provided by a rotating sharpening head having a pair of flexible abrasive webs attached thereto. Means are included in the rotating heads to automatically project the webs outwardly by centrifugal force against the action of adjustable spring means to place an abrasive portion of the webs in contact with a cutting edge.

Preferably, the rotating sharpening head of this invention is used in pairs so that opposite sides of a single cutting edge are alternately operated upon by means of the rotating abrasive webs in order to remove the feather which was produced on the cutting edge of the blade during the previous conventional grinding operation. Because of the novel arrangement of the present sharpening head and its adjustable centrifugally actuated abrasive webs, it is possible to alternately treat opposite bevels of a cutting edge with such accurate means for controlling the pressure against this edge, and at the same time, alternately strike the opposite bevels of the cutting edge with such rapidity, that the feather which was produced during the grinding operation is removed and a fine cutting edge is left on the cutting instrument, the axis of which is practically coincident with the longitudinal axis of the cutting blade, such that a most nearly perfect cutting edge is produced.

Accordingly, one of the primary objects of the present invention is to provide a rotating sharpening head having a pair of flexible, centrifugally actuated abrasive webs.

Another object of the present invention is to provide a rotating sharpening head, having a plurality of centrifugally actuated abrasive webs and including means for adjusting the tension utilized to urge the webs in contact with the periphery of the sharpening head.

Still another object of this invention is to provide a rotary sharpening head having a special peripheral configuration adapting it for use in pairs wherein the longitudinal major axis of each of the two rotating heads may be alternately applied to opposite sides of a cutting blade being interposed between the heads.

With these and other objects in view, which will more readily appear as the nature of the invention is better understood, the invention consists in the novel construction, combination and arrangement of parts hereinafter more fully described, illustrated and claimed.

A preferred and practical embodiment of the invention is shown in the accompanying drawings in which:

FIG. 1 is a perspective view of a sharpening head according to the present invention, and illustrates the abrasive webs in their fully expanded position.

FIG. 2 is a side elevation of a pair of sharpening heads according to the present invention as used in combination to produce the final extra-fine edge on a cutting blade.

FIG. 3 is a diagrammatic illustration of the feather produced on the cutting edge of a blade by the grinding operation previous to the final sharpening step.

FIG. 4 is a diagrammatic illustration of the final cutting edge as it would appear after the feather, as shown in FIG. 3 is removed by prior known conventional means.

FIG. 5 is a diagrammatic illustration of a perfect cutting edge having its center axis coincident with the longitudinal axis of the blade as produced by means of the present invention.

FIG. 6 is a side elevation of the present invention with the abrasive webs in their fully retracted position.

FIG. 7 is an end elevation view of the sharpening head shown in FIG. 6.

FIG. 8 is a transverse sectional view taken along the line 8—8 of FIG. 6.

FIG. 9 is a partial longitudinal sectional view illustrating the centrifugally actuated web controlling assembly.

FIG. 10 is a perspective view of an abrasive web as used in the invention.

Similar reference characters designate corresponding parts throughout the several views of the drawings.

Referring now to the drawings, particularly FIGS. 1, 2 and 6, it will be seen that the sharpening head generally designated A, comprises a main body 1 which in cross section, basically comprises an elliptical shape. Transversely disposed through the center point of the body 1 is a bore 2 adapted to receive suitable rotary driving means, such as a motor shaft, and includes a keyway 3 for positively anchoring the head to the shaft. Transversely mounted through the body 1 adjacent the periphery 1a are a pair of diametrically opposed web control assemblies. As previously described, the heads 1 are basically of elliptical shape. FIGS. 2 and 6 point out, however, that a pair of indentations 1b are formed in the periphery 1a of the body and bisected by the minor axis 30. This provides necessary clearance for the path of a fully expanded web 7 of head A, for example, when it is at its closest point with respect to head B, as seen in FIG. 2. Also mounted in diametrically opposed relationship are a pair of upstanding web engaging hooks 5, fixedly attached to the periphery 1a of the head and projecting outwardly therefrom.

Adapted to be adjustably supported around the opposed ends 6 of the sharpening head are a pair of abrasive webs 7 having a suitable abrasive material 7a deposited on one side thereof. For ease of manufacture, the webs are of symmetrical design and comprise a flexible resilient body portion having its opposite ends bifurcated to provide a pair of mounting recesses 8. Secured to each pair of spaced-apart ends 9 of the web is a mounting bar 10 bridging the recess 8. Thus it will be seen that the bars 10 may be slipped beneath the hook portions 5 projecting from the periphery of the body in order to fixedly secure one end of each of the webs to the head. Preferably, the periphery of the body immediately adjacent the hooks 5 are provided with a transverse, semi-circular recess 5a, the radius of which is at least as great as the radius of the web-wrapped mounting bar 10. It will be seen that this recess forms a positive seat for the end of the web deposited behind each of the hooked portions 5.

Novel adjustable means are provided for anchoring the opposite end of each web 7 to the head in the form of adjustable web control assemblies, generally designated 4.

Each web control assembly includes a circular drum 11 provided with a transverse slot 12 for receiving the second mounting bar 10 of the webs 7. The center of the drum 11 is provided with a transverse opening 13 through which is slidably disposed a hollow spindle 14. As will be most clearly seen in FIG. 8, the spindle 14 extends beyond the side walls 15 of the drum and is slidably journalled within passages 16 through the two side wall portions 17 in the body 1. The side walls 17 are formed in the body during the process of manufacturing the head A by any suitable means such as milling in order to provide the recess 13 within which each of the drums is disposed. Elongated transverse recesses 17a may be provided in the periphery of the side walls 17 to accommodate the ends of the bars 10 disposed in the slots 12 of the drums. A set screw 19 threaded through a peripheral wall of the drum 11 anchors the drum to the spindle 14, so that any rotary displacement of the drum will be transmitted as corresponding positive displacement of the spindle. One end of the spindle is enlarged to form a stop collar 20 abutting the outside surface of the body 1. A pair of congruent diametrically opposed limit recesses 21 are formed in the periphery of each of the collars 20 for reasons which will become apparent immediately hereinafter. A pair of stop pins 22 are fitted into the body 1 and project outwardly from the front surface thereof to extend into each of the limit recesses. These stop pins 22 are likewise diametrically opposed so that when the stop collar 20 is rotated in either direction, it will be seen that when the end of one of said recesses abuts its adjacent stop pin, the diametrically opposed recess will also and at the exact same time, abut one end of its adjacent recess. In this manner, any rotational movement transmitted through to the stop collar 20 by movement of the drum 11 will be equally met by the abutment of the stop pins 22 so that no uneven force will be applied to the web control assembly.

The interior of the hollow spindle 14 is threaded at the end adjacent the stop collar 20 in order to receive a set screw 23, having a suitable tool-receiving socket 24 such as an Allen socket, in its outer exposed face. The other end of the hollow spindle 14 is provided with a central bore 25 in which is disposed a coiled torque spring 26, having one end fixedly attached to the innermost portion of the set screw 23. The other, or free end of the spring, projects out from the spindle bore 25 and overlies the rear surface of the body 1. This free end 27 of the spring is secured to a fixed spring anchor pin 28 projecting from the rear surface of the body 1, adjacent the periphery of the passage 16. Thus, it will be seen that by rotating the socket set screw 23 in one or the other direction, that the tortional effect of the spring 26 may be increased or decreased as the case may be. The exposed end of the set screw 23 is provided with a lock nut 29 which may be tightened down upon the outer threads of the screw until contact is made with the outer face of the stop collar 20, in which manner, the socket screw 23 is firmly anchored against any rotational displacement.

From the foregoing, it will be observed that when tortional force is applied to the spring 26 by means of adjustment of the socket set screw 23, this tortional effect will be transmitted through the spindle 14 which has been anchored to the set screw by means of the lock nut 29, to the drum 11 which, in turn, is secured to the spindle by means of the screw 19. By utilizing a lefthand coiled spring, such as in FIG. 8 in the web control assemblies 4 as shown in FIG. 6, it will be seen that the drums 11 of these assemblies will be urged counter-clockwise as viewed in FIG. 6 towards the at-rest position shown therein.

When a pair of abrasive webs 7 are mounted on the head A by anchoring one of their ends about the hook portions 5 and the other of their ends within the slots 12 in the drums 11, the apparatus will appear as in FIG. 6 with the body of the webs retained in peripheral engagement with the ends 6 of the head due to the force of the spring urged drums 11. When the head is mounted upon a suitable rotating driving shaft, it will be seen that as the head rotates in a clockwise direction, the body of the webs 7 will, by means of centrifugal force, be thrown out of engagement with the ends 6 of the head and towards the positions shown in FIGS. 1 and 2. This centrifugal force will, of course, be against the resistance offered by the adjustable tortional springs 26 in the web control assemblies 4. Since this force will tend to further tighten these springs, it will thus be apparent that if before using the sharpening head the springs 26 are adjusted very tightly in order to obtain a terriffic amount of counter force, then a greater amount of centrifugal force or r.p.m.'s would be required to expand the webs 7 to the limits afforded by the limit recesses 21 in the stop collars 20. By regulating the adjustment of the springs 26, it is possible to select the pressure desired to exert against the webs 7 in order to obtain the required abrasive action in sharpening the cutting edges under consideration. It will be understood that different abrasive actions or force against the abrasive webs would be suitable for different types and sizes of cutting edges and with the present device it is a very simple matter to regulate this force merely by loosening the lock nuts 29 and adjusting the socket screws 23.

In practice, the sharpening head A of the present invention is used in combination with a similar sharpening head B such as shown in FIG. 2. Referring back to FIG. 6, it will be seen that each sharpening head according to this invention includes a main body having a major axis 29 which is substantially greater than its minor axis 30. No point of the sharpening head projects radially from the center of bore 2 a distance greater than one-half the major axis 29. Because of this arrangement, it is possible to sharpen a blade by applying the edge against the webs 7 even when the head is rotating so slowly that the webs are flush against the periphery 1a without any danger of the outwardly projecting hooks 5 or drums 11 striking the blade. When utilizing a pair of these sharpening heads, the heads A and B which are mounted on separate, motor spindles, are drivetn in synchronized contra-rotary directions so that their corresponding axes are at all times perpendicular to one another. FIG. 2 most graphically brings out this point, wherein it is shown that the major axis of sharpenging head A is perpendicular to the major axis of the sharpening head B. In this manner, it will be seen that due to the modified elliptical shape of each of the heads, at no time will the body or other structure of head A come in contact with any portion of the head B. At the same time, it will be noted that the path 31 described by the webs of one head while rotating in their expanded position cross the path 32 of the webs of the other head. This is so that there will be an overlapping as well as an alternate sharpening of the opposite edges of the cutting blade being operated upon. This has been found to be the most advantageous manner by which to remove the feather created during grinding and to produce the most perfect sharpened edge as exemplified in FIG. 5 wherein the center axis of the final sharpened cutting edge is most closely coincident with the longitudinal center axis of the cutting blade. As previously described, the heads 1 are basically of elliptical shape. FIGS. 2 and 6 point out, however, that a pair of indentations 1b are formed in the periphery 1a of the body and bisected by the minor axis 30. This provides necessary clearance for the path of a fully expanded web 7 of head A, for example, when it is at its closest point with respect to head B, as seen in FIG. 2.

I claim:

1. A sharpening head comprising a rotatable body portion having an arcuate peripheral surface, a flexible sharpening web disposed adjacent said peripheral surface, and means carried by said body portion attaching each of two ends of said web to said body portion to permit radial displacement of the medial portion of the web from the juxtaposed area of said peripheral surface, said attaching means including spring means engaging one end of said web to retain said web against said peripheral surface when the body portion is not rotating, whereby, upon rotation of said body portion said web is radially displaced by centrifugal force against the action of said spring means.

2. A sharpening head according to claim 1, wherein, said flexible sharpening web overlies a partial area of said peripheral surface.

3. A sharpening head according to claim 1, wherein, said rotatable body is substantially of elliptical shape and said sharpening web is disposed adjacent one end of said elliptical body.

4. A sharpening head according to claim 1, including a pair of said webs diammetrically disposed adjacent the peripheral surface of said body portion.

5. A sharpening head according to claim 4, wherein, said webs are carried by said surface opposite the major axis of said body, and said surface is provided with arcuate indentations opposite the minor axis of said body.

6. A sharpening head according to claim 1, wherein said attaching means comprises a spring-loaded web control assembly transversely mounted through said body portion and one end of said web is attached thereto.

7. A sharpening head comprising a rotatable body having a substantially elliptical-shaped peripheral surface, a flexible web disposed adjacent one end of said body in engagement with said peripheral surface, means removably attaching each of two ends of said web to said body, said means including, firstly, a hook projecting from said peripheral surface and engaging one end of said web, and secondly, a spring-loaded rotatable drum assembly mounted through said body and engaging the other end of said web, whereby rotation of said head causes said web to be radially displaced by centrifugal force away from engagement with said peripheral surface.

8. A sharpening head according to claim 7, wherein said web includes a pair of bifurcated ends each having a mounting bar secured therebetween, and said drum assembly includes a drum provided with a transverse peripheral slot, whereby said web is attached to said body by engaging one of said bars behind said hook and placing the other of said bars within said slot.

9. A sharpening head according to claim 7, wherein said peripheral surface is provided with a recess bounded by a pair of side walls, said drum assembly including a hollow spindle rotatably disposed through said side walls, a drum fixed upon said spindle between said walls, a torque spring within said spindle, one end of said spring projecting from said spindle, and anchored to said body, and adjustable means within said spindle connected to the other end of said spring, whereby regulation of said adjustable means determines the tortional force of said spring to vary the radial displacement of said web during rotation of said head.

10. A sharpening head according to claim 9, wherein said spindle is provided with a collar adjacent one of said side walls, an arcuate recess in said collar, a stop pin projecting from said wall adjacent said collar and disposed within said recess to limit the rotary displacement of said drum and spindle.

References Cited by the Examiner
UNITED STATES PATENTS

| | | | |
|---|---|---|---|
| 2,115,353 | 4/1938 | Walmsley | 51—382 |
| 2,161,112 | 6/1939 | Tuchmann | 51—334 |
| 2,411,633 | 11/1946 | Oberholtz. | |
| 2,465,225 | 3/1949 | Haren | 51—334 |
| 2,720,064 | 10/1955 | Klug | 51—334 |

LESTER M. SWINGLE, *Primary Examiner.*

ROBERT C. RIORDON, L. S. SELMAN, D. G. KELLY,
*Assistant Examiners.*